United States Patent
Rácz et al.

(10) Patent No.: US 9,634,925 B2
(45) Date of Patent: Apr. 25, 2017

(54) TECHNIQUE FOR NETWORK ROUTING

(75) Inventors: Sándor Rácz, Cegléd (HU); Balázs Peter Gerö, Budapest (HU); János Harmatos, Budapest (HU); Szilveszter Nádas, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 341 days.

(21) Appl. No.: 14/357,926

(22) PCT Filed: Aug. 17, 2012

(86) PCT No.: PCT/EP2012/003510
§ 371 (c)(1),
(2), (4) Date: Jul. 16, 2014

(87) PCT Pub. No.: WO2013/071988
PCT Pub. Date: May 23, 2013

(65) Prior Publication Data
US 2015/0180766 A1   Jun. 25, 2015

Related U.S. Application Data (60) Provisional application No. 61/560,551, filed on Nov. 16, 2011.

(51) Int. Cl.
*H04L 12/707* (2013.01)
*H04W 28/02* (2009.01)
(Continued)

(52) U.S. Cl.
CPC .............. *H04L 45/22* (2013.01); *H04L 47/12* (2013.01); *H04L 47/122* (2013.01);
(Continued)

(58) Field of Classification Search
CPC ..... H04L 47/122; H04L 47/125; H04L 47/14; H04L 45/22; H04L 47/12; H04W 76/041;
(Continued)

(56) References Cited

U.S. PATENT DOCUMENTS 7,233,569 B1   6/2007   Swallow
7,275,103 B1 *  9/2007   Thrasher ................ H04L 45/22
                                                    709/223
(Continued)

FOREIGN PATENT DOCUMENTS

CA   2770376 A1   2/2011
CA   2771818 A1   3/2011
(Continued)

OTHER PUBLICATIONS

IEEE, "IEEE Standard for Local and metropolitan area networks—Virtual Bridged Local Area Networks Amendment 5: Connectivity Fault Management", IEEE Computer Society Std 802.1ag, Dec. 17, 2007, 1-260.
(Continued)

*Primary Examiner* — Mark Rinehart
*Assistant Examiner* — Kenneth P Hunt
(74) *Attorney, Agent, or Firm* — Murphy, Bilak & Homiller, PLLC (57) ABSTRACT

A technique for routing one or more service tunnels in a telecommunications backhaul network (110) is provided. The telecommunications backhaul network has a first routing path (132) and a second routing path (134). As to a method aspect of the technique, data of the one or more service tunnels is transmitted on the first routing path (132). A reduction in transmission capacity is detected on the first routing path (134) by means of a first routing path condition. The first routing path condition indicates a state of the first routing path (132). A second routing path condition is
(Continued)

determined indicating a state of the second routing path (134) in response to the detected reduction in transmission capacity on the first routing path (132). It is decided upon rerouting one or more of the service tunnels from the first routing path (132) to the second routing path (132) based on both the first routing path condition and the second routing path condition.

12 Claims, 9 Drawing Sheets

(51) Int. Cl.
    H04W 28/04       (2009.01)
    H04W 40/12       (2009.01)
    H04W 76/04       (2009.01)
    H04L 12/803      (2013.01)
    H04L 12/801      (2013.01)

(52) U.S. Cl.
    CPC ............. *H04L 47/125* (2013.01); *H04L 47/14* (2013.01); *H04W 28/0268* (2013.01); *H04W 28/048* (2013.01); *H04W 40/12* (2013.01); *H04W 76/041* (2013.01)

(58) Field of Classification Search
    CPC  H04W 28/0268; H04W 28/048; H04W 40/12
    USPC ......................................................... 370/218
    See application file for complete search history.

(56) References Cited

U.S. PATENT DOCUMENTS

| | | | |
|---|---|---|---|
| 7,525,960 B2 | 4/2009 | Grabner et al. | |
| 7,693,055 B2 | 4/2010 | Vasseur et al. | |
| 7,852,748 B2 | 12/2010 | Le Faucheur et al. | |
| 8,165,015 B1 | 4/2012 | Busch | |
| 9,036,481 B1 | 5/2015 | White | |
| 2002/0064172 A1 | 5/2002 | Siu et al. | |
| 2002/0143983 A1 | 10/2002 | Jones et al. | |
| 2007/0248016 A1* | 10/2007 | Ashwood Smith | H04L 12/66 370/238 |
| 2008/0008092 A1 | 1/2008 | Wang et al. | |
| 2008/0281987 A1* | 11/2008 | Skalecki | H04L 12/4658 709/253 |
| 2010/0039935 A1* | 2/2010 | Davison | H04L 12/4633 370/228 |
| 2010/0061244 A1 | 3/2010 | Meier et al. | |
| 2010/0303024 A1 | 12/2010 | Gossain et al. | |
| 2011/0028146 A1* | 2/2011 | Tammisetti | H04L 45/125 455/426.1 |
| 2012/0014261 A1* | 1/2012 | Salam | H04L 43/0811 370/242 |
| 2012/0020222 A1* | 1/2012 | Nishioka | H04W 40/12 370/235 |
| 2012/0140625 A1* | 6/2012 | Long | H04L 47/12 370/231 |
| 2012/0163224 A1* | 6/2012 | Long | H04L 41/5025 370/252 |
| 2012/0275295 A1* | 11/2012 | Tanikawa | H04L 47/762 370/217 |
| 2013/0070654 A1* | 3/2013 | Nishimura | H04W 40/12 370/310 |
| 2014/0355447 A1* | 12/2014 | Gohite | H04W 40/34 370/236 |
| 2015/0382229 A1* | 12/2015 | Bhandari | H04W 28/0236 370/238 |
| 2016/0286462 A1* | 9/2016 | Gohite | H04W 40/34 |

FOREIGN PATENT DOCUMENTS

| | | | | |
|---|---|---|---|---|
| CN | 1889547 A | | 1/2007 | |
| CN | 101989917 A | | 3/2011 | |
| EP | 1416681 A1 | | 5/2004 | |
| WO | WO 2011020422 A1 | * | 2/2011 | ............. H04L 47/12 |
| WO | WO 2011022998 A1 | * | 3/2011 | ......... H04L 41/5025 |
| WO | WO 2011083747 A1 | * | 7/2011 | ............ H04W 28/18 |
| WO | WO 2011145708 A1 | * | 11/2011 | ............ H04W 40/12 |

OTHER PUBLICATIONS

Unknown, Author, "Ethernet Linear Protection Switching", Recommendation ITU-T G.8031/Y.1342. Series G: Transmission Systems and Media, Digital Systems and Networks; Packet over Transport aspects—Ethernet over Transport aspects; Series Y: Global Information Infrastructure, Internet Protocol Aspects and Next-Gen, undated.

Unknown, Author, "IEEE Standard for Local and Metropolitan Area Networks—Link Aggregation", IEEE Std 802.1AX—2008. IEEE Computer Society. Institute of Electrical and Electronics Engineers, Inc. Nov. 3, 2008. pp. 1-163. New York, NY, US.

Unknown, Author, "OAM Functions and Mechanisms for Ethernet Based Networks", ITU-T; G.8013/Y.1731 (Nov. 2013). Telecommunication Standardization Sector of ITU Series G: Transmission Systems and Media, Digital Systems and Networks; Packet over Transport aspects—Ethernet over Transport aspects; Series Y: Global Information Infrastructure, Internet Protocol Aspects and Next-Gen. Jun. 2011. 1-94.

* cited by examiner

Fig. 6A lost if failure occurs

Fig. 6B

Fig. 7A lost if failure occurs

Fig. 7B

Active drop if
degradation occurs

Fig. 7C

Fig. 8A lost if failure occurs

Fig. 8B

Active drop if
degradation occurs

Fig. 8C

Fig. 9A lost if failure occurs

Fig. 9B

Active drop of 2 CCMs from a triplet if degradation occurs

Fig. 9C

TECHNIQUE FOR NETWORK ROUTING

TECHNICAL FIELD

The present disclosure relates to a technique for routing data packets in a network. In particular, and without limitation, the disclosure relates to a technique for rerouting a service tunnel in a telecommunications network.

BACKGROUND

In networks a service tunnel routed between a pair of end points may be protected by rerouting the service tunnel from a currently used routing path to an alternative routing path when a transmission capacity of the currently used routing path becomes insufficient for the service tunnel. Such rerouting is also referred to as dynamic load sharing or protection switching.

Networks with varying transmission capacity at some network links along the routing path can exhibit capacity degradation or even failure of a link. A microwave network with Adaptive Modulation (AM) is an example of a network intentionally designed for link capacity variations. AM is an abundantly deployed solution, e.g., in telecommunications backhaul networks, since AM is an efficient tool to increase the link capacity by adaptively switching to a higher modulation level, if the decreased availability of the higher modulation level can be tolerated. The links are controlled to harness the higher modulation level as long as a Signal-to-Noise Ratio (SNR) of the link is sufficiently high, and to adapt the modulation level as the SNR declines. For example, if a microwave link is planned to provide approximately 100 Mbps link capacity with 99.999% availability by using a Quadrature Amplitude Modulation with 4 constellation points (4-QAM), the link applies 256-QAM achieving a link capacity of approximately 450 Mbps in case of good radio conditions.

As the above example illustrates, the capacity decrease can be quite significant, potentially impacting data of the service tunnel transmitted via the link so that strict Quality of Service (QoS) requirements (e.g., as to delay, jitter and loss of data packets of the service tunnel) can no longer be fulfilled.

In case of double-connected networks, it is possible to protect the impacted service tunnels using a protection switching mechanism. For example, the International Telecommunication Union (ITU) has defined Ethernet Automatic Protection Switching (ETH-APS) in its Recommendation ITU-T G.8031/Y.1342 of June 2011. When the link has failed or its transmission capacity is reduced due to AM, the loss of Continuity Check Messages (CCMs) triggers the rerouting of the impacted service tunnel. End points of the service tunnel then reroute the service tunnel to the alternative path, which does not contain the failed link. In case of services with strict QoS requirements, the rerouting should be completed within a prescribed minimum time. As an example, certain telecommunications applications require resuming within 50 ms.

However, a lower modulation level does not entail the loss of CCMs so that conventional protection switching is not activated. Furthermore, conventional protection switching does not always lead to fulfillment of prescribed QoS requirements. In some situations there is connectivity between the two end-points, so conventional protection switching mechanisms are not activated, but there is capacity degradation, which results in service degradation. In some other situations, the activated protection switching even worsens service performance. Such situations can be observed in microwave networks in case of heavy rain, and more generally, when a plurality of links is impacted in a correlated manner.

SUMMARY

Accordingly, there is a need for a routing technique that avoids, at least in some scenarios, detrimental changes in the routing of the service tunnels.

According to one aspect, a method of routing one or more service tunnels in a telecommunications backhaul network is provided. The telecommunications backhaul network includes a first routing path and a second routing path. The method comprises the steps of transmitting data of the one or more service tunnels on the first routing path, detecting a reduction in transmission capacity on the first routing path by means of a first routing path condition indicating a state of the first routing path determining a second routing path condition indicating a state of the second routing path in response to the detected reduction in transmission capacity on the first routing path, and deciding upon rerouting one or more of the service tunnels from the first routing path to the second routing path based on both the first routing path condition and the second routing path condition.

The rerouting decision need not depend on the condition of only one of the first routing path and the second routing path. Any decision metric may be applied that combines the influence of the first routing path condition and the second routing path condition on the decision. For example, the conditions may be logically combined or added, optionally including a numerical weighting of the conditions.

Considering a combination of the first routing condition and the second routing condition, the rerouting from the first routing path to the second routing path may be prevented when the rerouting would not improve or even worsen a transmission performance. The transmission performance may generally be determined by one or more transmission rates for the service tunnels. The transmission rates may be estimated for a performance expected after the rerouting based on both the first routing path condition and the second routing path condition. A sum of the transmission rates for each of the service tunnels may determine the transmission performance. Alternatively or in addition, the transmission performance may be determined by the lowest transmission rate of the service tunnels.

Data of the service tunnels may be transmitted exclusively using the first routing path in a stage at and/or prior to the decision. The first routing path may be a currently used path and/or a primary path. The second routing path may be a currently unused path and/or a backup path. The second routing path may be an alternative routing path to the first routing path. Components of the telecommunications backhaul network may technically exclude that a service tunnel is partially rerouted (e.g., using for one service tunnel both the first routing path and the second routing path).

Each of the routing paths may correspond to a physical path in the telecommunications backhaul network. Each of the service tunnels may include a stream of data or a series of data packets. A Virtual Local Area Network (VLAN) may be an example of a service tunnel (e.g., using layer-2 switching by means of VLAN identifiers). An Internet Protocol (IP) subnet may be another example of a service tunnel (e.g., using layer-3 routing by means of routing tables). Alternatively or in addition, VLAN may be used for identifying a service tunnel. In IP/MPLS networks, the service tunnel may be an LSP (label switched path).

The telecommunications backhaul network may include a plurality of second routing paths. A corresponding plurality of second routing path conditions may be determined. Each of the plurality of second routing path conditions may be determined for one of the second routing paths. The decision may be based on a combination of the first routing path condition and the second routing path conditions.

The first and second routing paths may include a plurality of nodes (also referred to as "points") and/or links between the nodes. Each of the first and second routing paths may include at least three nodes and/or at least two links. The detected reduction in transmission capacity may correspond to a decline of the first routing path condition. The detected reduction in transmission capacity may be due to a reduction in link capacity of one or more links of the first routing path. The transmission capacity on the first routing path may correspond to the lowest link capacity in the first routing path. The telecommunications backhaul network may include one or more wireless links. The links may include one or more microwave links.

The first routing path may define a pair of end points. The end points of the first routing path may also be end points of the second routing path or of each of the plurality of second routing paths. The pair of end points may be the forking points of the first and second routing paths. The second routing path or each of the plurality of second routing paths may be different from the first routing path. First and second routing paths may differ in all or at least one intermediate point and/or may differ in all or at least one link.

A node associated with an end point of a routing path and/or a service tunnel may be referred to as a Maintenance End Point (MEP) or, generally, an edge node. An intermediate node that is not an edge node within a routing path and/or a service tunnel may be referred to as a Maintenance Intermediate Point (MIP) or, generally, an intermediate node. The second routing path or each of the plurality of second routing paths may have at least one intermediate node different from the nodes of the first routing path and/or at least one link different from the links of the first routing path.

Each of the service tunnels may be defined as a logical connection between the end points of the first routing path. Each of the service tunnels may be defined and/or identifiable independently of intermediate points involved in its transmission.

The decision may determine one of the alternatives of maintaining the routing of all service tunnels on the first routing path, rerouting some of the service tunnels to the second routing path, and rerouting all service tunnels to the second routing path. Further, the decision may determine to maintain the routing on the first routing path, if a second transmission capacity indicated by the second routing path condition for the second routing path is lower than the detected routing capacity indicated by the first routing path condition for the first routing path.

The method may further comprise the step of rerouting the one or more service tunnels according to the decision. The detected reduction in transmission capacity on the first routing path may limit a transmission rate of the one or more service tunnels on the first routing path. The rerouted one or more service tunnels may include service tunnels impacted by the reduction in transmission capacity. The rerouting may be performed by one or both of the end points of the service tunnels.

At least one of the first routing path condition and the second routing path condition may differentiate between degradation and failure of the respective routing path. At least one of the first routing path condition and the second routing path condition may indicate a state of normal operation, degradation, or failure. The decision may be based on a logical combination of respective states of the first routing path condition and the second routing path condition. At least one of the first routing path condition and the second routing path condition may further indicate different levels of degradation.

At least one of the first routing path condition and the second routing path condition may be determined by transmitting a connectivity failure detection message (CFDM) on the respective routing path. The CDFM may be a Continuity Check Message (CCM), for example according to IEEE 802.1ag or ITU-T Recommendation Y.1731. The CDFM may alternatively be a Continuity Check (CC) message, for example according to the Multiprotocol Label Switching (MPLS) Transport Profile (TP) for MPLS Traffic Engineering (MPLS-TE).

A periodicity of the transmitted CFDMs may be 3.3 ms or less. A time required for performing one of the steps of detecting and determining may be 10 ms or less. A total time required for performing the steps of detecting, determining, and deciding may be 50 ms or less.

On one or each of the first routing path and the second routing path, a number of CFDMs may be actively dropped in a predefined pattern. The number and/or the pattern may be associated with a state of the respective routing path and/or determine the respective routing path condition.

A series of CFDMs may be transmitted on one or each of the first and second routing paths. The routing of the service tunnels on the first routing path may be maintained if one of the CFDMs or multiple CFDMs (e.g., a triplet of three consecutive CFDMs) are lost on the second routing path.

Two or more series of the CFDMs may be transmitted on one or each of the first routing path and the second routing path. The CFDMs of different series may be discriminable, for example by at least one of the MEPs and the MIPs. The CFDMs may be discriminable by means of a series identifier transmitted with each of the CFDMs. All CFDMs on one of the routing paths may use the same service tunnel. Alternatively, the CFDMs transmitted on the same routing path and belonging to different series may use different service tunnels to be discriminable. For instance, the CFDMs belonging to different series on the same routing path may belong to different service tunnels. The CFDMs belonging to different series may be associated with different modulation levels applied at one or more of the links. The different modulation levels may be detected by the MIPs. The association may be interpreted by the MEPs.

Alternatively or in combination, the CFDMs belonging to different series may include different priority bits associated with different routing path conditions. On each of the first routing path and the second routing path, those CFDMs, which include a priority bit associated with the respective routing path condition, are actively dropped. Alternatively, those CFDMs, which do not include a priority bit associated with the respective routing path condition, are actively dropped.

According to another aspect, a computer program product is provided. The computer program product comprises program code portions for performing one or more of the steps of the method aspect described herein when the computer program product is executed on one or more computing devices. The computer program product may be stored on a computer-readable recording medium such as a permanent or rewriteable memory. The computer program product may also be provided for download via one or more computer networks, such as the Internet, a telecommunications network, or a wireless or wired Local Area Network (LAN).

As for a hardware aspect, a device for routing one or more service tunnels in a telecommunications backhaul network is provided. The telecommunications backhaul network includes a first routing path and a second routing path. The devise comprises a transmitting unit adapted to transmit data of the one or more service tunnels on the first routing path, a detecting unit adapted to detect a reduction in transmission capacity on the first routing path by means of a first routing path condition indicating a state of the first routing path, a determining unit adapted to determine a second routing path condition indicating a state of the second routing path in response to the detected reduction in transmission capacity on the first routing path, and a deciding unit adapted to decide upon rerouting one or more of the service tunnels from the first routing path to the second routing path based on both the first routing path condition and the second routing path condition.

The above-mentioned units or additional units of the device may be further adapted to perform one or more of the steps mentioned in the context of the method aspect herein.

Also provided is a telecommunications backhaul network comprising the device as well as the first and second routing path.

BRIEF DESCRIPTION OF THE DRAWING

In what follows, further details and advantages of the present disclosure are described with reference to exemplary embodiments illustrated in the drawings, wherein FIG. 1 schematically illustrates an exemplary telecommunications network environment of an embodiment of a device for routing one or more service tunnels in a telecommunications backhaul network including a first routing path and a second routing path.

DETAILED DESCRIPTION

In the following, for purposes of explanation and not limitation, specific details are set forth, such as particular sequences of steps, components and configurations, in order to provide a thorough understanding of the present disclosure. It will be apparent to a person skilled in the art that the disclosure may be practiced in other embodiments that depart from these specific details. For example, while the embodiments are described with reference to an exemplary telecommunications backhaul network, it will be apparent to the skilled person that the disclosure can also be practiced in the context of other such networks. Furthermore, while the disclosure is primarily described in terms of Virtual Local Area Networks (VLANs) or rerouting decisions on OSI layer 2, the disclosure may, partially or completely, be implemented on other layers (e.g., OSI layer 3 or higher layers) and/or using transmission protocols providing other rerouting techniques, such as network protocols based on the Ethernet.

Moreover, those skilled in the art will appreciate that services, functions, logic components and steps explained herein may be implemented using software functioning in conjunction with a programmed microprocessor, or using an Application Specific Integrated Circuit (ASIC), a Digital Signal Processor (DSP) or a general purpose computer. It will also be appreciated that, while the following embodiments are described in the context of methods and devices, the technique presented herein may also be embodied in a computer program product as well as in a system comprising a computer processor and a memory coupled to the processor, wherein the memory is encoded with one or more programs to executed the services, functions, logic components and steps disclosed herein.

Figure 1:
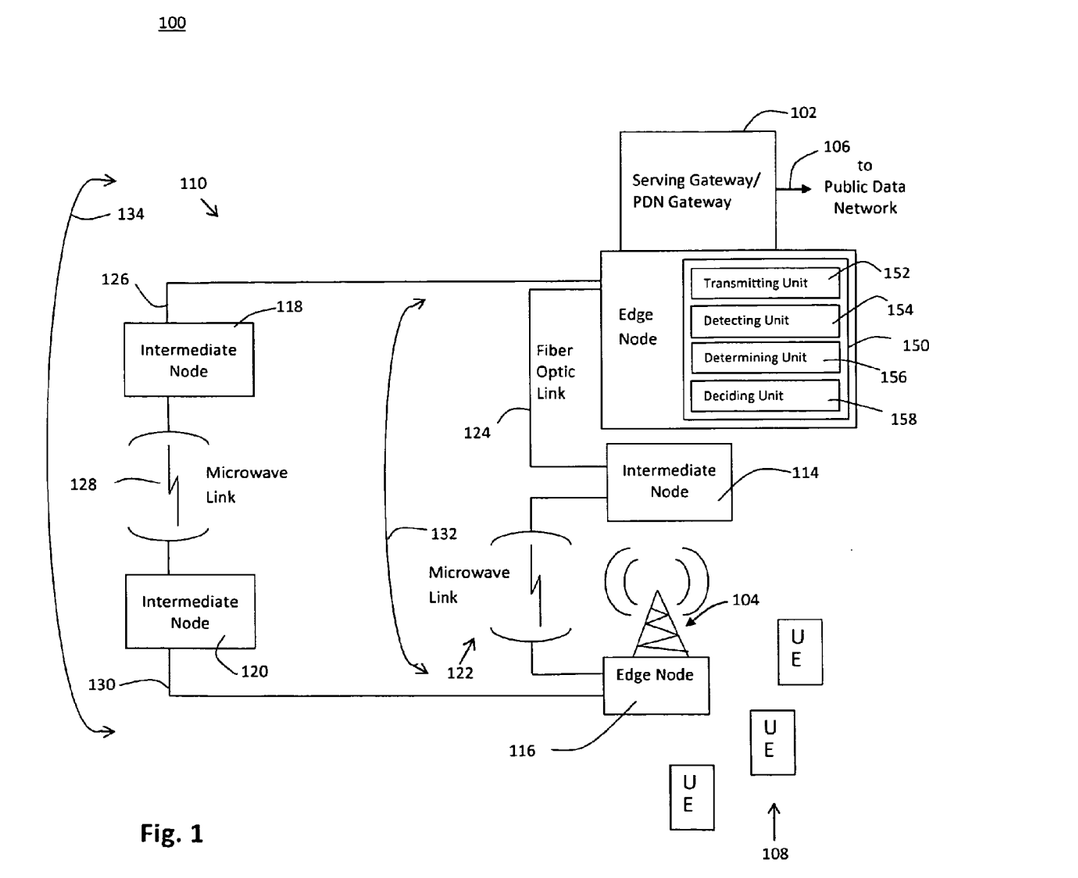

FIG. 1 schematically illustrates an embodiment of a telecommunications network 100 including a gateway 102 and a base station 104 out of a plurality of base stations, each of which is in wireless communication with a respective plurality of User Equipments (UE) 108. The gateway 102 and the base station 104 are mutually connected by means of a backhaul network 110. The gateway 102 provides a connection 106 to a core network or a Public Data Network.

The backhaul network 110 includes a plurality of network nodes 112 to 120 and a plurality of links 122 to 130 configured for bidirectional communication between topologically adjacent pairs of the network nodes 112 to 120. The network nodes 112 to 120 can be further differentiated from a point of view of network topology. The two network nodes 112 and 116 are edge nodes connected twice within the communications backhaul network 110 via a first routing path 132 and via a second routing path 134 that is physically distinct from the first routing path 132. The remaining network nodes 114, 118 and 120 are distinct from the edge nodes 112 and 116 in that they are intermediate points along one of the routing path 132 or 134. Each of the intermediate nodes 114, 118 and 120 and each of the links 122 to 130 is part of either the first routing path 132 or the second routing path 134.

While the telecommunications backhaul network 110 shown in FIG. 1 includes double-connected edge nodes 112 and 116, it will be appreciated that the backhaul network 110 can have more than two distinct routing paths, each of which connects the edge nodes 112 and 116. Furthermore, the telecommunications backhaul network 110 can include additional intermediate nodes and links. The additional network components can create a more complex network topology, for example including one or more meshes or loops.

The links 122 to 130 of the telecommunications backhaul network 110, and even links within one of the routing paths 132 and 134, can be implemented using different wired or wireless connection techniques on the physical layer. In the example of FIG. 1, the link 122 is a microwave link and the link 124 is a fiber optical link of the first routing path 132. The second routing path 134 includes the microwave link 128 and the wired links 126 and 130. Link capacities of each of the technically separate microwave links 122 and 128 can exhibit a correlation, for example due to large-area events influencing the signal to noise ratio of the links 122 and 128, such as fog or rainfall.

Data traffic between the edge nodes 112 and 116 is initially routed along the first routing path 132. A reduction in transmission capacity, which includes a failure of the connectivity (i.e., a reduction to zero) or a degradation (e.g., due to Adaptive Modulation, AM, in response to reduced radio conditions at the microwave link 122), may be detected. Conventionally, the edge nodes 112 and 116 react to the reduction in transmission capacity by rerouting a service tunnel impacted by the reduction from the first routing path 132 to the second routing path 134. If, however, the second routing path 134 also includes a failed or degraded link, for example due to a correlated perturbation of both the microwaves link 122 in the first routing path 132 and the microwave link 128 in the second routing path 134, the situation can be even worsened when there is no or not enough transmission capacity on the second routing path 134 for the one or more service tunnels routed along the second routing path 134. As a consequence, rerouted data packets can be lost and time for reestablishing the service tunnel connectivity between the edge nodes 112 and 116 (e.g., by rerouting to a third routing path or avoiding any rerouting) has been wasted.

Conventional techniques of detecting a reduction in transmission capacity have focused on the "active" first routing path 132. The present disclosure extends conventional rerouting mechanisms, for example by using similar techniques or enhancements thereof on the "backup" second routing path 134.

In a first implementation of capacity reduction detection, an active or passive measurement of the transmission capacity of the first routing path 132 or of the link caparity of one or more of the links 122, 124 along the first routing path 132 allows detecting a link failure and, optionally, also the degradation of a link by observing both data throughput and traffic loss.

Performing such a measurement may have disadvantages in terms of timescale and accuracy. In case the service tunnel is associated with a Quality of Service (QoS) requirement that has to be completed in a prescribed outage time $T_{QoS}$, for example 50 ms, the rerouting decision has to be completed in even less time. The measurement often cannot determine a first routing path condition that is accurate enough as a basis for deciding upon the rerouting within the short time $T_{QoS}$. As a consequence, a proper detection of the reduction in transmission capacity, and in particular a differentiation between failure and degradation, is not possible by performing measurements on the first routing path 132.

In a second implementation of capacity reduction detection, a message is sent from the intermediate node 114 adjacent to the link 122, which causes the reduction in transmission capacity, to the edge nodes 112 and 116. The message includes a current link capacity value.

While such bandwidth information could be enough to detect the reduction in transmission capacity and/or to distinguish between link degradation and failure, the delay associated with signaling the link capacity value often violates the prescribed maximum outage time $T_{QoS}$. The signaling may even be impossible, if no alternative message signaling path, which does not include the failed link 122, is available between the intermediate node 114 and the edge node 112.

A third implementation of capacity reduction detection uses a connectivity failure detection message (CFDM). The CDFM may correspond to or may be based on a Continuity Check Message (CCM), for example as specified by the International Telecommunication Union (ITU) in the ITU-T Recommendation Y.1731. As another example, the CDFM may correspond to or may be based on a Continuity Check (CC) message, for example according to the Multiprotocol Label Switching (MPLS) Transport Profile (TP) for MPLS Traffic Engineering (MPLS-TE). A standard-compliant usage of CFDMs allows the edge nodes 112 and 116 to verify the connectivity along the first routing path 132 (i.e., to detect a link failure).

However detecting a failure on the active first routing path 132 can be delayed, because CFDMs are typically sent with high priority for indicating the connectivity while data of the service tunnel is already impacted by an undetected link degradation.

In a fourth implementation of capacity reduction detection, the CFDMs are actively dropped by the intermediate node 114 to indirectly signal to the edge nodes 112 and 116 not only a failure of the link 122, but also link degradation. For this unconventional usage of the CFDMs, the intermediate node 114 actively drops those CFDMs associated to a certain service tunnel, which requires more link capacity than provided by the link 122, in order to comply with its QoS requirements.

The active dropping of CFDMs informs the edge nodes 112 and 116 that the corresponding service tunnel is impacted by the capacity degradation. A first routing path condition differentiating between link degradation and link failure is still not available to the edge nodes 112 and 116. This remains true even if the active dropping is extended by configuring the edge nodes 112 and 116 to use different CFDMs for different causes of the active dropping, including degradation and failure of the impacted service tunnel. Especially when link capacities are different along the first routing path 132, a certain tunnel can be impacted if a low capacity link is degraded or a high capacity link has failed. Consequently, the actively dropped CFDMs cannot provide information differentiating between failure and degradation.

As has become apparent, information provided to the edge nodes 112 and 116 by means of the above implementations of detecting a reduction of the transmission capacity on the first routing path 132 is sometimes not sufficient for deciding upon rerouting an impacted service tunnel.

FIG. 1 shows an embodiment of a device 150 for routing one or more service tunnels in the telecommunications backhaul network 110 including the first routing path 132 and the second routing path 134. The device 150 comprises a transmitting unit 152, a detecting unit 154, a determining unit 156, and a deciding unit 158. In the embodiment of the device 150 shown in FIG. 1, the device 150 is collocated with the edge node 112. In another embodiment of the device 150, different functional units of the device 150 are distributed in the telecommunications backhaul network 110. For example, the different functional units of the device 150 are collocated with different components along the first routing path 132. Alternatively, different functional units of the device 150 are arranged at the edge nodes 112 and 116.

Figure 2:
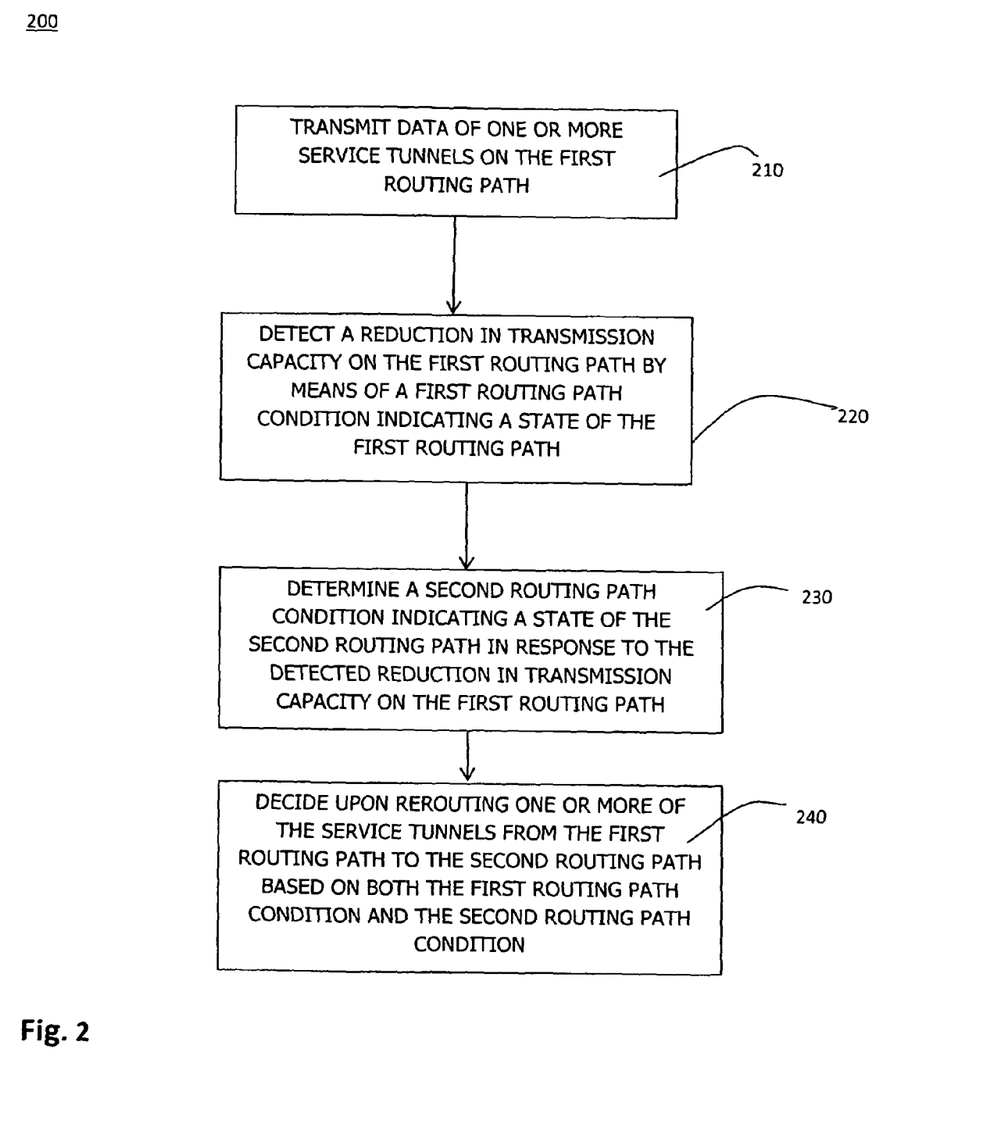
FIG. 2 shows a flowchart of an embodiment of a method of routing one or more service tunnels in the telecommunications backhaul network of FIG. 1.

FIG. 2 shows a flowchart of an embodiment of a method 200 of routing one or more service tunnels in a telecommunications backhaul network including a first routing path and a second routing path. The device 150 of FIG. 1 or any other device may be adapted to perform the method 200.

The method 200 comprises a step 210 of transmitting data of the one or more service tunnels on the first routing path 132. The method 200 further comprises a step 220 of detecting a reduction in transmission capacity on the first routing path 132 by means of a first routing path condition indicating a state of the first routing path 132. For example, one of the four implementations discussed above can be used for the step 220 of detecting the reduction in transmission capacity.

The method 200 also comprises a step 230 of determining a second routing path condition indicating a state of the second routing path 134 in response to the detected reduction in transmission capacity on the first routing path 132. For example, one of the four detection implementations can be applied to the second routing path 134 for the determination 230. The method 200 further comprises a step 240 of deciding upon rerouting one or more of the service tunnels from the first routing path 132 to the second routing path 134 based on both the first routing path condition and the second routing path condition. Each of the units 152 to 158 is adapted to perform a corresponding one of the steps 210 to 240 of the method 200.

Figure 3:
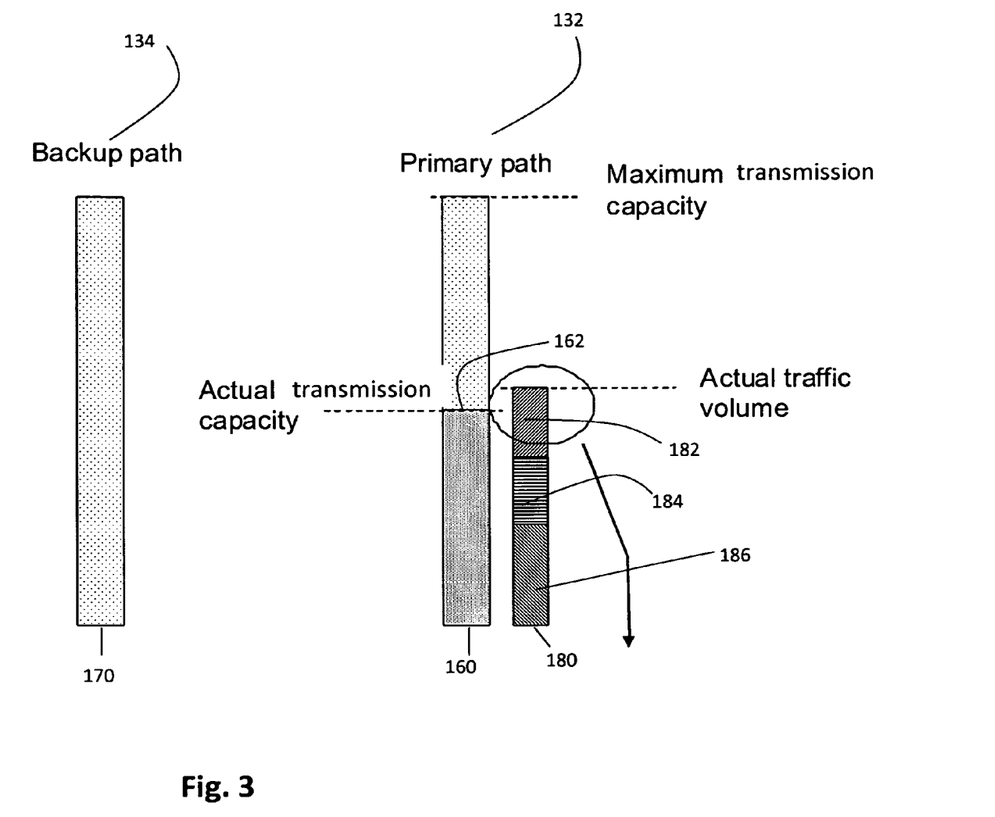
FIG. 3 schematically illustrates a first scenario of a reduction in transmission capacity.

FIG. 3 schematically illustrates a first condition scenario 300. Here, routing path 132 is also referred to as a primary path, and the second routing path 134 is also referred to as a backup path. A first routing path condition 160 indicating a state 162 of the first routing path 132 is indicated by a vertical bar. The vertical extension indicates the transmission capacity. Similarly, a second routing path condition 170 indicating a state of the second routing path 134 is shown on the left-hand side of FIG. 3. In the first condition scenario 300, a link failure in the second routing path 134 causes that the state of the second routing path 134 is "failure".

Data of three service tunnels are transmitted on the first routing path 132 according to the steps 210. A total traffic volume requirement 180 of all service tunnels is indicated on the right-hand side of FIG. 3. Individual traffic volume requirements 182, 184 and 186 for each of the three service tunnels are also indicated in FIG. 3.

In the condition scenario 300 shown in FIG. 3, the transmission capacity of the first routing path 132 was initially sufficient to comply with the traffic volume requirement 180. A reduction in transmission capacity has occurred on the first routing path 132 leading to a conflict with the traffic volume requirement 180 of the service tunnels currently routed on the first routing path 132. A conventional rerouting decision based solely on the first routing path condition 160 would reroute one service tunnel (indicated by an ellipse in FIG. 3) to the second routing path 134. Consequently, the conventional rerouting decision would lead to a collapse of the rerouted service tunnel.

By determining the second routing path condition 170 according to the step 230 and deciding upon rerouting one of the three service tunnels based on both conditions 160 and 170 according to the step 240, the collapse of one of the three service tunnels is avoided by a negative rerouting decision.

Figure 4:
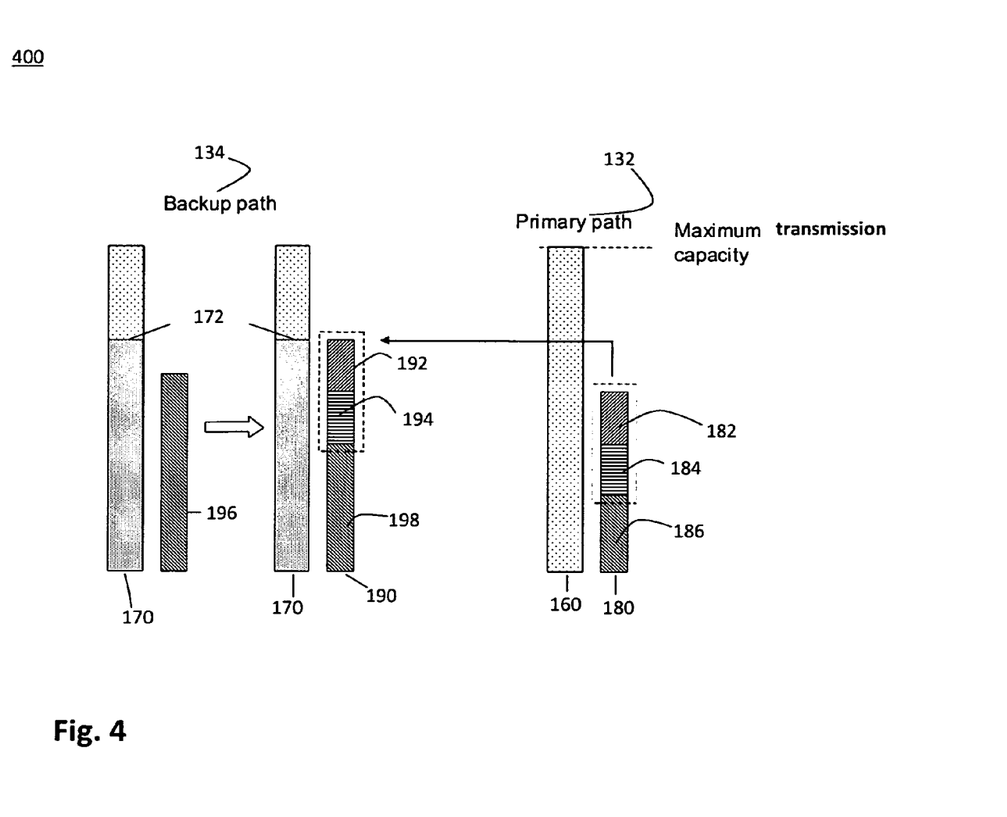
FIG. 4 schematically illustrates a second scenario of a reduction in transmission capacity.

FIG. 4 shows a second condition scenario 400, wherein the state indicated by the first routing path condition 160 for the first routing path 132 is "failure" and the second routing path condition 170 indicates a degraded state 172 of the second routing path 134. The decision 240 results in rerouting two high-priority service tunnels, requiring respective traffic volumes 182 and 184, from the first routing path 132 to the second routing path 134. This allows maintaining the traffic volume requirements 182 and 184 on the second routing path 134, as is indicated by reference signs 192 and 194 within the total traffic volume 190, after the rerouting decision 240. Low-priority traffic 196 transmitted on the second routing path 134 prior to the rerouting decision 240 is reduced to a traffic volume 198 as a residual capacity given the state 172 of the second routing path 134. A third service tunnel with transmission volume 186 prior to the failure of the first routing path 132 is terminated.

Figure 5:
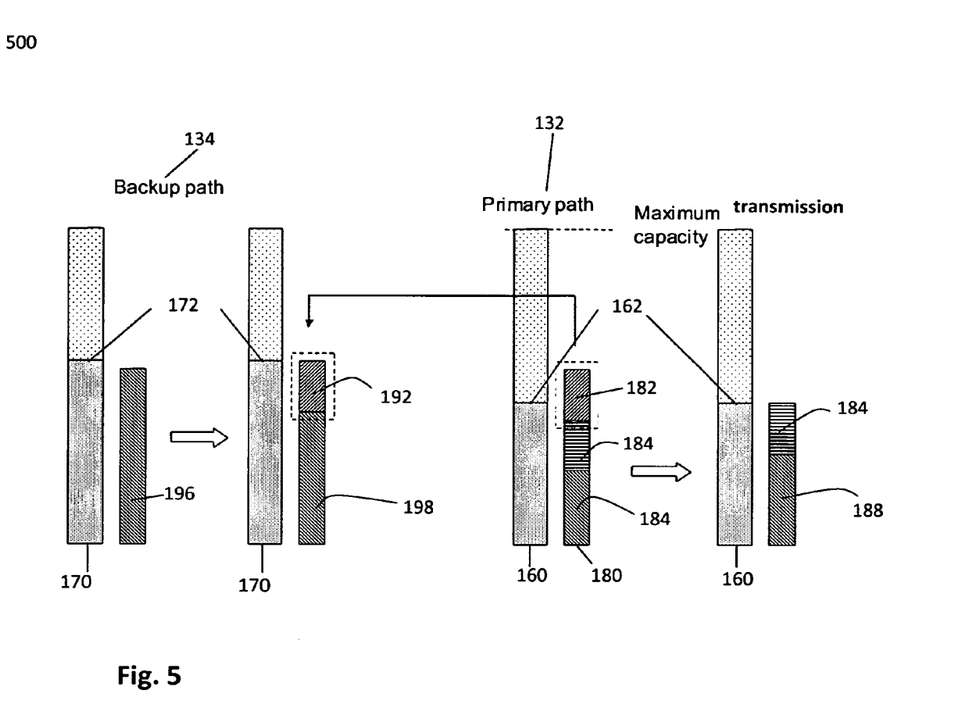
FIG. 5 schematically illustrates a third scenario of a reduction in transmission capacity.

FIG. 5 shows a third condition scenario 500 with degradation on both the first routing path 132 and the second routing path 134. Initially, data is transmitted according to the step 210 on the first routing path 132 with total traffic volume 180 including contributions 182, 184 and 186 from each of three service tunnels routed along the first routing path 132 prior to the reduction in transmission capacity on the first routing path 132. The detection of the reduction in transmission capacity according to the step 220 reveals that at least one of the three service tunnels on the first routing path is impacted by the reduction. Consequently, the high-priority service tunnel with traffic volume 182 is rerouted in view of the second routing path condition 170 determined according to the step 230. The traffic volume 192 of the rerouted high-priority service tunnel on the second routing path 134 is maintained after the rerouting decision 240 at the cost of low-priority traffic 196 transmitted on the second routing path 134 prior to the rerouting decision 240, which is reduced to the remaining traffic volume 198 given the state 172 of the second routing path 134. In the absence of the high-priority service tunnel 182 on the first routing path 132 after the rerouting, the fixed traffic volume 184 is maintained and the variable traffic volume 186 is increased to the traffic volume 188 remaining given the state 162 of the first routing path 132.

As exemplified by means of the condition scenarios 300, 400 and 500, taking the second routing path condition 170 additionally into account when deciding upon the rerouting in the step 240 can improve the availability of services provided by means of the telecommunications backhaul network 110. For a beneficial rerouting decision 240, at least failure on the first routing path 132 (e.g., the condition scenarios 400) or failure on the second routing path 134 (e.g., the condition scenarios 300) should be detected.

The rerouting decision 240 in the condition scenario 500 further differentiates between degradation and failure occurring on the first routing path 132 and/or on the second routing path 134. For a detection 220 by means of the first routing path condition 160 indicating the reduction as a change in the state 162 from "normal operation" of the first routing path 132 to either "degradation" or "failure", and for a determination 230 of the second routing path condition 170 indicating the state 172 by differentiating between "normal operation", "degradation" and "failure" of the second routing path 134, the decision 240 upon rerouting a service tunnel impacted by the reduction in transmission capacity on the first routing path 132 is implemented according to the following rerouting matrix:

|  | First routing path 132 | | |
| --- | --- | --- | --- |
| Second routing path 134 | Normal operation | Degradation | Failure |
| Normal operation | No | Yes | Yes |

| | First routing path 132 | | |
|---|---|---|---|
| Second routing path 134 | Normal operation | Degradation | Failure |
| Degradation | No | The decision additionally takes a level of degradation of each of the first routing path 132 and the second routing path 134 into account to use the full available bandwidth. Optionally, additional information about priority levels is taken into account so that a traffic volume of a high-priority service tunnel is maintained and/or a traffic volume of a low-priority service tunnel is adjusted. | Additional information about the level of degradation on the second routing path 134 is taken into account so that a congestion on the second routing path 134 is avoided. Optionally, additional information about priorities of the service tunnels is taken into account, e.g., by rerouting only high-priority service tunnels. |
| Failure | No | No | No |

The first routing path condition 160 determines the column of the rerouting matrix and the second routing path condition 170 determines the row in the rerouting matrix. The first routing path condition 160 and the second routing path condition 170 can be derived by any combination of the four implementations of the detection discussed above. For example, the state "failure" can be detected by the loss of CFDMs. The state "degradation" can be detected by configuring the intermediate nodes for actively dropping the CFDMs in case of degradation at a link adjacent to the intermediate node.

Furthermore, the decision 240 fulfills the maximum outage time $T_{QoS}$ requirement, for example by periodically transmitting CFDMs on the second routing path 134 so that the second routing path condition 170 is readily determined in response to the detested reduction in transmission capacity.

Further details of four implementations of the step 230 of determining the second routing path condition 170 are described below with reference to the FIGS. 6 to 9. As an exemplary setup of the telecommunications backhaul network 110 used to illustrate all four implementations of the determination 230, three intermediate nodes 113, 114 and 115 are arranged in pairwise communication and define the first routing path 132. Three further intermediate nodes 118, 119 and 120 are arranged in pairwise communication and define the second routing path 134 between the edge nodes 112 and 116.

Figure 6A:
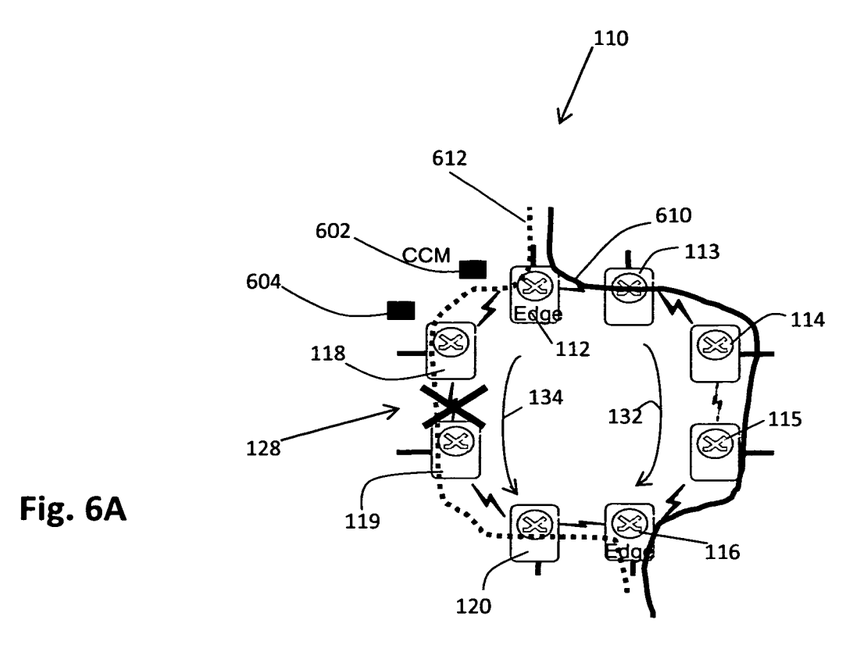
FIGS. 6A and 6B schematically illustrate a first example of determining a routing path condition.
Figure 6B:
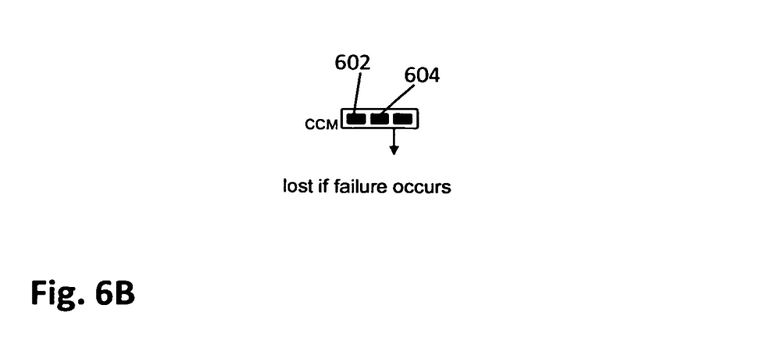

FIG. 6A shows a first implementation of the determination 230 using a single CFDM series on the second routing path 134. The first implementation shown in FIGS. 6A and 6B is a minimalist implementation providing the advantage that the intermediate nodes along the second routing paths, e.g., the intermediate nodes 118 and 119, do not have to be reconfigured and the edge nodes 112 and 116 also do not have to be configured for an unconventional CFDM transmission. The edge nodes 112 and 116 define an OAM association (wherein OAM abbreviates the functions Operation, Administration, and Maintenance) for each of the first routing path 132 and the second routing path 134. The CFDMs are transmitted conventionally, for example in accordance to the IEEE standard connectivity fault management defined in the standard document IEEE 802.1ag (as approved on 27 Sep. 2007 and published on 17 Dec. 2007) or in accordance to MPLS-TE. CFDM frames 602 and 604 are carried along the second routing path 134 on the highest priority, so that the CFDM frame 602 and 604 are only lost in case of failure.

FIG. 6B schematically illustrates the conventional loss of the CFDM frame 602 and 604 at the link 128 in the case of link failure. No active dropping of CFDM frames has to be implemented at the intermediate nodes 118, 119 and 120.

For ease of illustration, FIG. 6A shows only one service tunnel 610, data of which is transmitted prior to the reduction in transmission capacity according to the step 210. The edge nodes 112 and 116 can identify the service tunnel on OSI layer 2 based on its tunnel identifier "VLAN_1". The CFDM frames 602 and 604 on the second routing path 134 are associated to a backup tunnel 612 designed by the OSI layer 2 identifier "VLAN_11".

The second routing path condition 170 indicates the presence or absence of a link failure (shown in FIG. 6A for the link 128) and thus predetermines the routing decision 240 according to the first or third row of above rerouting matrix.

In a minimalist alternative, the second routing path condition 170 does not have to indicate a degradation on the second routing path 134. The tunnel 610 is rerouted from the first routing path 132 to the second routing path 134 in response to the detected reduction in transmission capacity, if the second routing path condition 170 does not indicate a failure (even if the second routing path 134 is degraded). The tunnel 610 is kept on the first routing path 132, if the second routing path condition 170 indicates a failure. Optionally, the rerouting is subject to an additional capacity requirement. For example, the edge nodes 112 and 116 can assume that in the absence of a failure indicated by the second routing path condition 170, the second routing path 134 is in normal operation and an available capacity is computed as the difference between the maximum transmission capacity of the second routing path 134 and traffic volume already routed along the second routing path 134 prior to the rerouting decision.

The deciding unit 158 keeps the tunnel 610 on the first routing path 132 as CFDM loss is detected on both the first routing path 132 and the second routing path 134. The reason for the corresponding configuration of the rerouting matrix is that the CFDM loss on the first routing path 132 implies degradation or failure, and that the CFDM loss on the second routing path 134 always implies failure (due to the high priority of the CFDM frames 602 and 604). Consequently, the conventional rerouting is suppressed and the situation is not worsened (if the first routing path 132 was only degraded).

Figure 7A:
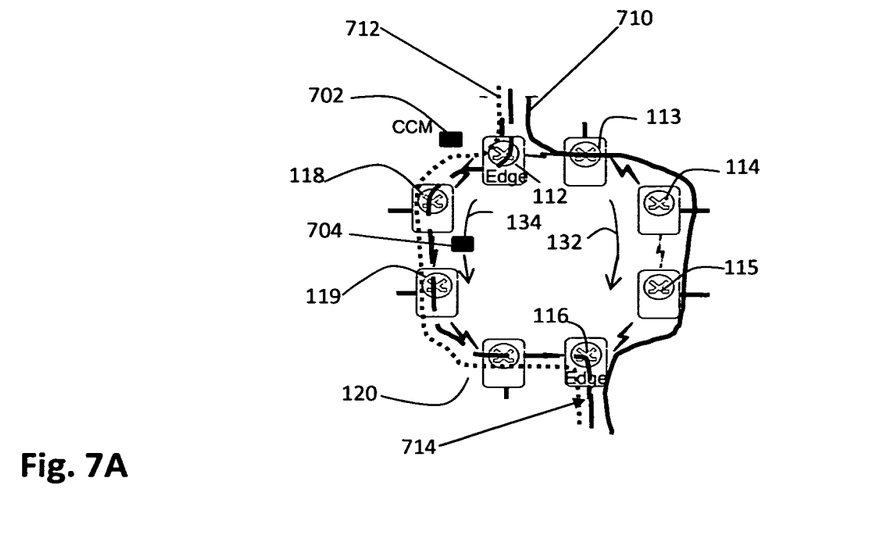
FIGS. 7A, 7B and 7C schematically illustrate a second example of determining a routing path condition.
Figure 7B:
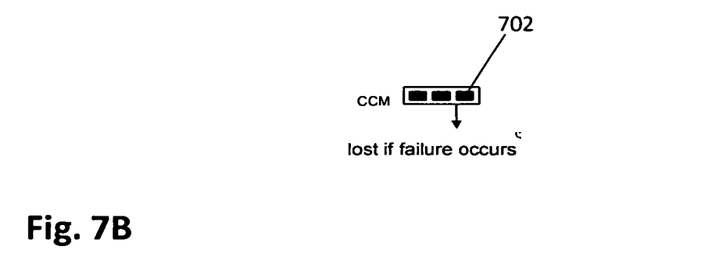
Figure 7C:
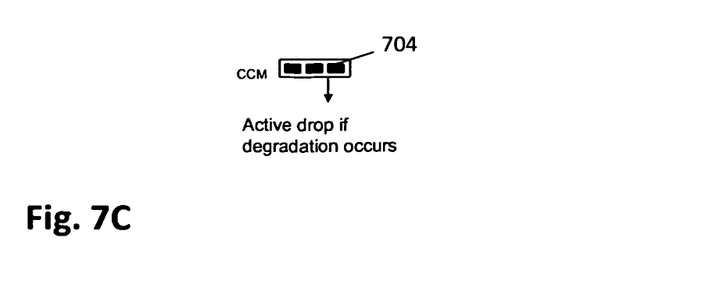

FIGS. 7A, 7B and 7C schematically illustrate a second implementation of the determination 230. The second implementation can be considered as an extension of the first implementation described with reference to the FIGS. 6A and 6B. Data of a service tunnel 710 is transmitted according to the step 210 on the first routing path 132 prior to the reduction of the transmission capacity. The data packets of the service tunnel 710 are identified by the edge nodes 112 and 116 reading the identifier "VLAN_1". Two or more CFDM series are transmitted on the second routing path 134 (or on each of the second routing paths in case of more than one backup path).

A first CFDM series is used to indicate, if a link of the second routing path 134 has failed. The intermediate nodes 118, 119 and 120 do not act upon a CFDM frame 702 of the first CFDM series. The contribution of the first CFDM series to determining the second routing path condition 170 according to the step 230 is thus similar to the first implementation of the determination 230 by only detecting a link failure. As pointed out before, the CFDM frame 702 of the first CFDM series should have the highest priority.

A second CFDM series including a CFDM frame 704 provides degradation information to the edge nodes 112 and 116. The intermediate nodes 118, 119 and 120 along the second routing path 134 are configured to actively drop all the CFDM frames 704 of the second CFDM series in case a link associated to the intermediate node is degraded. For this purpose, the intermediate nodes 118, 119 and 120 can have access to a dropping table indicating a lower link capacity limit for each service tunnel. Degradation is thus determined relative to a specific service tunnel. Loss or reception of the CFDM frames 702 and 704 of the first and second CFDM series allow each of the edge nodes 112 and 116 to determine the second routing path condition 170 indicating normal operation, degradation or failure.

More than two CFDM series can also be implemented to further differentiate between different levels of degradation. An association between the multiple CFDM series and corresponding levels of degradation (e.g., different modulation levels) has to be implemented in each of the intermediate nodes 118, 119 and 120. The edge nodes 112 and 116 interpret the loss of CFDM frames according to the association in the step 230. The second implementation of the determination thus allows also applying the second row of above rerouting matrix.

Each of the multiple CFDM series is associated to a different tunnel, as shown by the tunnels 712 and 714 for the case of two CFDM series. Each of the nodes (including edge nodes 112, 116 and intermediate nodes 118-120) along the second routing path 134 can identify each of the CFDM frames 702 and 704 as belong to either the first or second CFDM series based on its OSI layer-2 identifier "VLAN_11" or "VLAN_12", respectively.

FIG. 7B shows the association between CFDM frames 702 of the first CFDM series as indicators for failure. FIG. 7C shows the association between actively dropped CFDM frames 704 of the second series as indicators for the occurrence of a degradation. Both associations are implemented for the determination 230 at the edge nodes 112 and 116.

While the second implementation of the determination 230 has been described for the second routing path 134, the detection 220 by means of the first routing path condition 160 is also based on multiple CFDM series applied to the first routing path 132 in a variant, which allows implementing the full rerouting matrix.

Figure 8A:
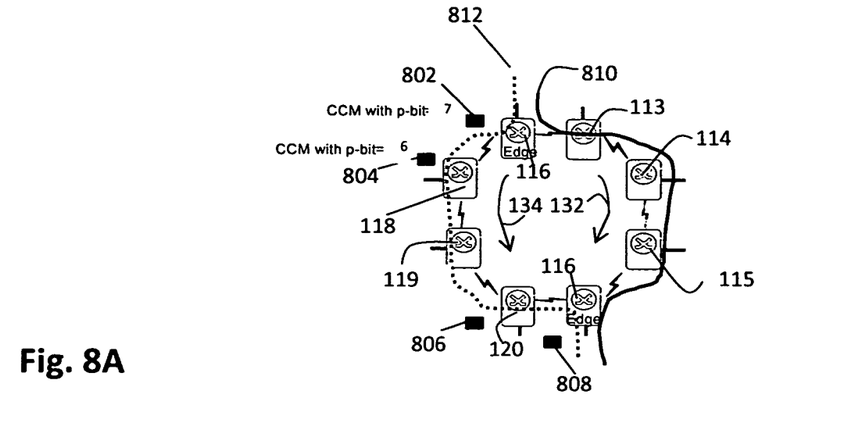
FIGS. 8A, 8B and 8C schematically illustrate a third example of determining a routing path condition.
Figure 8B:
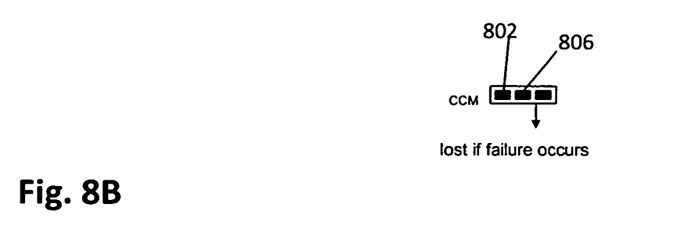
Figure 8C:
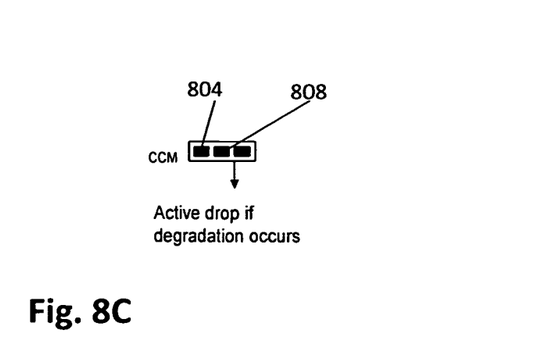

The FIGS. 8A, 8B and 8C schematically illustrate a third implementation of the determination 230. Data of a service tunnel 810 is transmitted according to the step 210 on the first routing path 132 prior to the reduction of the transmission capacity. The third implementation can be considered as a variant of the second implementation avoiding the usage of a second tunnel on the second routing path 134. The two CFDM series belong to the same backup tunnel 812.

Since each of the CFDM frames 802, 804, 806 and 808 are carried by the same tunnel 812, it is not possible to differentiate between the CFDM frames 802 and 806 of the first CFDM series and the CFDM frames 804 and 808 of the second CFDM series based on the OSI layer 2 identifier VLAN_11 designating the backup tunnel 812. The two CFDM series are distinguished using different priority bits. For example, the Ethernet Header includes a 3-bit field indicating a priority level of the frame. The CFDM frames 802 and 806 of the first CFDM series have the highest priority value 7, which is used to indicate "failure". The CFDM frames 804 and 808 of the second CFDM series have the priority level value 6, which is used to indicate "degradation".

The edge nodes 112 and 116 are configured to generate two different CFDM series (instead of one CCM series as specified in the ITU-T Recommendation Y.1731, "OAM functions and mechanisms for Ethernet based networks") with different priority values. The edge nodes 112 and 116 are further configured to interpret the loss of CFDM frames as indicators of the condition of the second routing path 134 according to the association between the priority level and the state (e.g., degradation or failure).

The intermediate nodes 118, 119 and 120 are adapted to parse the header of CFDM frames belonging to a tunnel impacted by link degradation (e.g., according to the dropping table), to check whether a degradation level corresponds to the priority level in the header and to drop CFDM frames with matching priority level values.

The third implementation of the determination 230 provides the differentiation between failure and degradation without increasing the number of tunnels required on the second routing path 134. On the other hand, the third implementation requires a non-standardized CFDM handling, so that both the edge nodes 112 and 116 and the intermediate nodes 118 to 120 have to support abovementioned features.

Different levels of degradation can be distinguished by using more than two CFDM series, each CFDM series being distinguished by a different priority level value. In properly dimensioned networks, the CFDM frames with lower priority are rarely dropped for reasons other than link degradation, so that cases of false indication are rare.

In all implementation alternatives, the transmission period of the CFDM frames of each CFDM series should correspond to the standard transmission period of 3.3 ms, so that the second routing path condition 170 can be determined by detecting the corresponding state within 10 ms, which is sufficient to detect the loss of 3 consecutive CFDM frames of the corresponding CFDM series. As a consequence, the transmission period considering all CFDM frames is not standard-conform (since the standard prescribes a minimum intermediate time between CFDM frame transmissions to be 3.3 ms). On average, the transmission period of all CFDM frames is a fraction of the standard transmission period corresponding to the number of different CFDM series.

The third implementation can also be applied to the first routing path 132 for a first routing path condition 160 differentiating between normal operation, degradation and failure, and optionally including further levels of degradation.

Figure 9A:
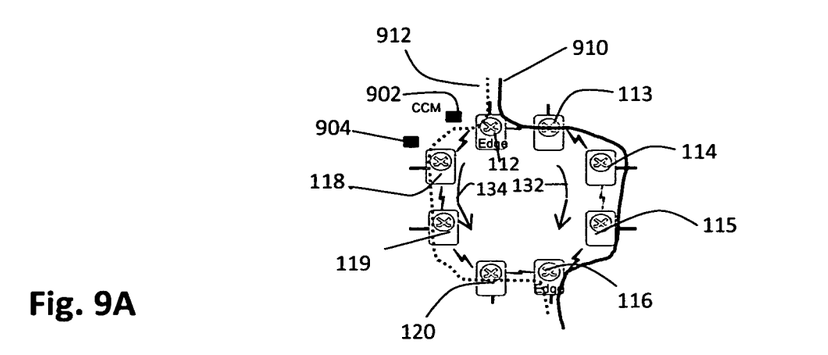
FIGS. 9A, 9B and 9C schematically illustrate a fourth example of determining a routing path condition.
Figure 9B:
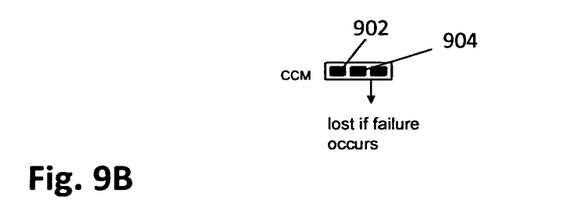
Figure 9C:
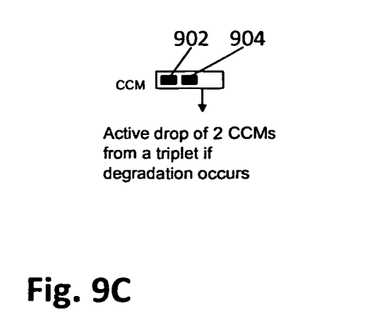

FIGS. 9A, 9B and 9C schematically illustrate a fourth implementation of the determination 230. CFDM frames 902 and 904 are transmitted as a single CFDM series on a single backup tunnel 912. Degradation of a link along the second routing path 134 is associated with a specific pattern of dropping the CFDM frames 902 and 904 of the single CFDM series. In the case of a CFDM duplet, link degradation may correspond to dropping one out of the two CFDM frames 902 and 904 of the CFDM duplet, which differs from the case of failure indicated to the edge nodes 112 and 116 by the loss of all CFDM frames 902 and 904 of the CFDM duplet.

In a variant of the fourth implementation, a CFDM triplet is periodically transmitted by the edge nodes 112 and 116 and the loss of two CFDM frames out of the CFDM triple indicates link degradation, which differs from the case of failure indicated to the edge nodes 112 and 116 by the loss of all CFDM frames of the CFDM triple.

The edge nodes 112 and 116 are configured to detect the loss pattern of CFDM frames 902 and 904 associated with the degradation (or even different levels of degradation). According to the standardized operation, the loss of two consecutive CFDM frames out of the CFDM triplet does not generate any rerouting at the edge nodes 112 and 116, whereas the edge nodes 112 and 116 in the fourth implementation interpret the loss of two consecutive CFDM frames as a second routing path condition 170 indicating degradation and apply the rerouting matrix accordingly.

The intermediate nodes 118-120 are configured to drop the CFDM frames 902 and 904 in a pattern associated to the link degradation detected by the respective intermediate node. FIGS. 9B and 9C schematically illustrate the dropping pattern associated with failure and degradation, respectively.

The fourth implementation of the determination 230 has a higher risk of uncertainty, because the second routing path condition 170 is determined at the edge nodes 112 and 116 based on the reception or loss of the third CFDM frame of the triplet, which determines the difference between degradation (two lost CFDM frames from the triplet) and failure (when the third CFDM frame is also lost). The third implementation thus provides not the high level of certainty associated with determining each of the states based on the reception or loss of the full triplet, as shown in the FIGS. 8B and 8C for the states of failure and degradation, respectively.

While the forth implementation has been described for the second routing path 134, the CFDM dropping based on prescribed dropping patterns can also be applied to the first routing path 132.

As has become apparent from above description of exemplary embodiments, at least some of the embodiments prevent worsening service performance by conventional rerouting mechanisms. At least some of the embodiments guarantee a fast rerouting operation, for example within 50 ms. The same or some other embodiments allow differentiating between failure and degradation on a first routing path and/or on the one or more second routing paths used as backup paths.

A granularity of a rerouting matrix can be chosen depending on prescribed quality of service requirements and/or a complexity of the embodiment. At least some of the embodiments are scalable (e.g., in terms of network size).

As will be recognized by those skilled in the art, the features described herein can be modified and varied over a wide range of applications. Accordingly, the scope of the patented subject-matter should not be limited to any of the specific exemplary teachings discussed above but is defined by the following claims.

The invention claimed is:

1. A method of routing one or more service tunnels in a telecommunications backhaul network including a first routing path and a second routing path, the method comprising:
   transmitting data of the one or more service tunnels on the first routing path;
   detecting a reduction in transmission capacity on the first routing path by means of a first routing path condition indicating a state of the first routing path;
   determining a second routing path condition indicating a state of the second routing path, in response to the detected reduction in transmission capacity on the first routing path; and
   deciding upon rerouting one or more of the service tunnels from the first routing path to the second routing path based on both the first routing path condition and the second routing path condition, wherein the rerouting from the first routing path to the second routing path is prevented when the rerouting would not improve one or more transmission rates for the service tunnels, the transmission rates being estimated for a performance expected after the rerouting based on both the first routing path condition and the second routing path condition;
wherein at least one of the first routing path condition and the second routing path condition is determined by transmitting connectivity failure detection messages (CFDMs) on the respective routing path, wherein two or more series of connectivity failure detection messages are transmitted on one or each of the first routing path and the second routing path, wherein the connectivity failure detection messages of different series are discriminable, and wherein different modulations are associated to the connectivity failure detection messages belonging to different series.

2. The method of claim 1, wherein the decision determines one of the alternatives of maintaining the routing of all service tunnels on the first routing path, rerouting some of the service tunnels to the second routing path, and rerouting all service tunnels to the second routing path.

3. The method of claim 1, wherein at least one of the first routing path condition and the second routing path condition differentiates between degradation and failure of the respective routing path.

4. The method of claim 1, wherein each of the first routing path condition and the second routing path condition differentiates between states of normal operation, degradation, and failure, and wherein the decision is based on a combination of the state of the first routing path and the state of the second routing path.

5. The method of claim 1, wherein the detected reduction in transmission capacity on the first routing path limits a transmission rate of the one or more service tunnels on the first routing path.

6. The method of claim 1, wherein a total time required for performing the steps of detecting, determining, and deciding is 50 milliseconds or less.

7. The method of claim 1, wherein a number of connectivity failure detection messages are actively dropped on each of the first routing path and the second routing path, the number depending on the respective routing path condition.

8. The method of claim 1, wherein a series of connectivity failure detection messages is transmitted on the second routing path, wherein the routing of the one or more service tunnels on the first routing path is maintained if one or more of the connectivity failure detection messages are lost on the second routing path.

9. A method of routing one or more service tunnels in a telecommunications backhaul network including a first routing path and a second routing path, the method comprising:
- transmitting data of the one or more service tunnels on the first routing path;
- detecting a reduction in transmission capacity on the first routing path by means of a first routing path condition indicating a state of the first routing path;
- determining a second routing path condition indicating a state of the second routing path, in response to the detected reduction in transmission capacity on the first routing path; and
- deciding upon rerouting one or more of the service tunnels from the first routing path to the second routing path based on both the first routing path condition and the second routing path condition, wherein the rerouting from the first routing path to the second routing path is prevented when the rerouting would not improve one or more transmission rates for the service tunnels, the transmission rates being estimated for a performance expected after the rerouting based on both the first routing path condition and the second routing path condition;

wherein at least one of the first routing path condition and the second routing path condition is determined by transmitting connectivity failure detection messages (CFDMs) on the respective routing path, wherein two or more series of connectivity failure detection messages are transmitted on one or each of the first routing path and the second routing path, wherein the connectivity failure detection messages of different series are discriminable, wherein the connectivity failure detection messages belonging to different series include different priority bits associated with different routing path conditions, and wherein connectivity failure detection messages that include a priority bit associated with the respective routing path condition are actively dropped on one or each of the first routing path and the second routing path.

10. A non-transitory computer-readable medium comprising, stored thereupon, computer program code portions for routing one or more service tunnels in a telecommunications backhaul network including a first routing path and a second routing path, the computer program code portions being configured for execution on one or more computing devices and to cause the one or more computing devices to:
- transmit data of the one or more service tunnels on the first routing path;
- detect a reduction in transmission capacity on the first routing path by means of a first routing path condition indicating a state of the first routing path;
- determine a second routing path condition indicating a state of the second routing path, in response to the detected reduction in transmission capacity on the first routing path; and
- decide upon rerouting one or more of the service tunnels from the first routing path to the second routing path based on both the first routing path condition and the second routing path condition, wherein the rerouting from the first routing path to the second routing path is prevented when the rerouting would not improve one or more transmission rates for the service tunnels, the transmission rates being estimated for a performance expected after the rerouting based on both the first routing path condition and the second routing path condition;

wherein at least one of the first routing path condition and the second routing path condition is determined by transmitting connectivity failure detection messages (CFDMs) on the respective routing path, wherein two or more series of connectivity failure detection messages are transmitted on one or each of the first routing path and the second routing path, wherein the connectivity failure detection messages of different series are discriminable, and wherein different modulations are associated to the connectivity failure detection messages belonging to different series.

11. A device for routing one or more service tunnels in a telecommunications backhaul network including a first routing path and a second routing path, the device comprising:
- a transmitting circuit adapted to transmit data of the one or more service tunnels on the first routing path;
- a detecting circuit adapted to detect a reduction in transmission capacity on the first routing path by means of a first routing path condition indicating a state of the first routing path;
- a determining circuit adapted to determine a second routing path condition indicating a state of the second routing path in response to the detected reduction in transmission capacity on the first routing path; and
- a deciding circuit adapted to decide upon rerouting one or more of the service tunnels from the first routing path to the second routing path based on both the first routing path condition and the second routing path condition, wherein the deciding circuit is further adapted to prevent the rerouting from the first routing path to the second routing path when the rerouting would not improve one or more transmission rates for the service tunnels, the deciding circuit being adapted to estimate the transmission rates for a performance expected after the rerouting based on both the first routing path condition and the second routing path condition;

such that at least one of the first routing path condition and the second routing path condition is determined by transmitting connectivity failure detection messages (CFDMs) on the respective routing path, wherein two or more series of connectivity failure detection messages are transmitted on one or each of the first routing path and the second routing path, wherein the connectivity failure detection messages of different series are discriminable, and wherein different modulations are associated to the connectivity failure detection messages belonging to different series.

12. A telecommunications backhaul network comprising the device of claim 11, the first routing path and the second routing path.

* * * * *